United States Patent
Liu et al.

(10) Patent No.: US 10,966,257 B2
(45) Date of Patent: Mar. 30, 2021

(54) RANDOM ACCESS METHOD, TERMINAL APPARATUS, AND NETWORK APPARATUS

(71) Applicant: Guangdong OPPO Mobile Telecommunications Corp., Ltd., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/478,346

(22) PCT Filed: Jan. 23, 2017

(86) PCT No.: PCT/CN2017/072286
§ 371 (c)(1),
(2) Date: Jul. 16, 2019

(87) PCT Pub. No.: WO2018/133125
PCT Pub. Date: Jul. 26, 2018

(65) Prior Publication Data
US 2019/0373641 A1    Dec. 5, 2019

(51) Int. Cl.
*H04W 74/08*    (2009.01)
*H04W 76/27*    (2018.01)
*H04W 76/18*    (2018.01)
*H04W 74/00*    (2009.01)

(52) U.S. Cl.
CPC ..... *H04W 74/0833* (2013.01); *H04W 74/002* (2013.01); *H04W 76/18* (2018.02); *H04W 76/27* (2018.02)

(58) Field of Classification Search
CPC .......... H04W 74/0833; H04W 74/002; H04W 74/04; H04W 76/18; H04W 76/27
See application file for complete search history.

(56) References Cited

U.S. PATENT DOCUMENTS

| 2009/0168750 A1* | 7/2009 | Pelletier | H04W 56/0045 370/350 |
| 2010/0124932 A1* | 5/2010 | Harada | H04L 1/1812 455/450 |

(Continued)

FOREIGN PATENT DOCUMENTS

| CN | 101132627 A | 2/2008 |
| CN | 102316600 A | 1/2012 |

(Continued)

OTHER PUBLICATIONS

European Search Report dated Jan. 8, 2020 from Application No. PCT/CN2017/072286.

(Continued)

*Primary Examiner* — Candal Elpenord

(57) ABSTRACT

A method for random access, a terminal device, and a network device are provided. The method includes that: a terminal device sends an access request message to a network device and indicates access auxiliary information of the terminal device to the network device through the access request message; the terminal device receives an access response message sent by the network device according to the access request message, wherein the access response message includes indication information for indicating rejection of access of the terminal device, and the indication information includes access suggestion information corresponding to the access auxiliary information.

10 Claims, 9 Drawing Sheets

300

A terminal device sends an access request message to a network device, and indicates access auxiliary information of the terminal device to the network device through the access request message — 310

The terminal device receives an access response message sent by the network device according to the access request message, wherein the access response message includes indication information for indicating rejection of access of the terminal device, and the indication information includes access suggestion information corresponding to the access auxiliary information — 320

(56) References Cited

U.S. PATENT DOCUMENTS

| | | | | |
|---|---|---|---|---|
| 2010/0290407 | A1* | 11/2010 | Uemura | H04W 74/0866 370/329 |
| 2012/0082099 | A1 | 4/2012 | Bienas et al. | |
| 2013/0242730 | A1 | 9/2013 | Pelletier et al. | |
| 2014/0133430 | A1* | 5/2014 | Yang | H04L 5/0055 370/329 |
| 2015/0139144 | A1* | 5/2015 | Chai | H04W 72/0426 370/329 |
| 2015/0264733 | A1* | 9/2015 | Guo | H04W 48/06 370/329 |
| 2016/0044727 | A1* | 2/2016 | Zisimopoulos | H04W 48/02 455/41.2 |
| 2018/0184460 | A1* | 6/2018 | Hou | H04W 74/0833 |

FOREIGN PATENT DOCUMENTS

| | | |
|---|---|---|
| CN | 102448117 A | 5/2012 |
| CN | 103491644 A | 1/2014 |
| CN | 104584462 A | 4/2015 |
| CN | 106332152 A | 1/2017 |
| EP | 2063659 A1 | 5/2009 |
| RU | 2577028 C2 | 3/2016 |
| WO | 2015010631 A1 | 1/2015 |

OTHER PUBLICATIONS

3GPP TSG GERAN CIoT Adhoc #3 GPC150329 Kista, Sweden, Jun. 29-Jul. 2, 2015.
English translation of OA for Russia application 2019125450 dated Apr. 28, 2020.
Decision on Grant a Patent Invention for Russia Application 2019125450/07 (049839) dated Aug. 13, 2020.
Invitation to Respond to Written Opinion for SG Application 11201906734W dated Jul. 20, 2020.
Canada Office Action for CA Application 3,051,015 dated Sep. 4, 2020.
Communication under Rule 71(3) EPC, Intention to Grant for EP Application 17892963.4 dated Feb. 9, 2021.

* cited by examiner

300

```
A terminal device sends an access request message
to a network device, and indicates access auxiliary     ~310
information of the terminal device to the network
device through the access request message
```

```
The terminal device receives an access response message
sent by the network device according to the access request
message, wherein the access response message includes
indication information for indicating rejection of access    ~320
of the terminal device, and the indication information
includes access suggestion information corresponding
to the access auxiliary information
```

```
A network device acquires access          ~410
auxiliary information of a terminal device
```

```
The network device determines access suggestion
information corresponding to the access auxiliary     ~420
information according to the access auxiliary information
```

```
The network device sends an access response message to
the terminal device, and the access response message    ~430
includes the access suggestion information
```

A terminal device sends an access request message to a network device — 510

The terminal device receives an access response message sent by the network device according to the access request message — 520

The terminal device determines access suggestion information corresponding to access auxiliary information of the terminal device according to the access response message — 530

A network device acquires an access request message of a terminal device — 610

The network device sends an access response message to the terminal device according to the access request message, wherein the access response message includes a first mapping relationship including a correspondence between a plurality of pieces of access auxiliary information and a plurality of pieces of access suggestion information — 620

FIG. 6

RANDOM ACCESS METHOD, TERMINAL APPARATUS, AND NETWORK APPARATUS

CROSS-REFERENCE TO RELATED APPLICATION(S)

This application is a 371 application of International Application No. PCT/CN2017/072286, filed on Jan. 23, 2017, the entire disclosure of which is hereby incorporated by reference.

TECHNICAL FIELD

The implementations of the present disclosure relate to the field of wireless communication, and more particularly relate to a method for random access, a terminal device, and a network device.

BACKGROUND

In a Long Term Evolution (LTE) system, when a terminal device performs random access, if a current network is congested, the network will reject the access of the terminal device through a Radio Resource Control (RRC) connection rejection message after the terminal device initiates an RRC connection setup request; or the network releases the terminal device that has set up an RRC connection through an RRC connection release message and indicates to the terminal device that the network is congested. However, when the network rejects the access of terminal device, it releases all terminal devices or all services. These terminal devices will try to re-access after being rejected by the network device. When the quantity of terminals is large, an access success rate of the terminal device is obviously reduced.

SUMMARY

The implementations of the present disclosure provide a method for random access, a terminal device, and a network device.

In a first aspect, there is provided a method for random access, including: sending, by a terminal device, an access request message to a network device, and indicating access auxiliary information of the terminal device to the network device through the access request message; and receiving, by the terminal device, an access response message sent by the network device according to the access request message, wherein the access response message includes indication information for indicating rejection of access of the terminal device, and the indication information includes access suggestion information corresponding to the access auxiliary information.

Optionally, in an implementation of the first aspect, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, in an implementation of the first aspect, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, in an implementation of the first aspect, the access suggestion information includes at least one of: information of a duration during which the terminal device is prohibited from accessing, information of a cell where the network device suggests the terminal device to reside, and information of a network that the network device suggests the terminal device to access.

Optionally, in an implementation of the first aspect, the sending, by the terminal device, the access request message to the network device, and indicating the access auxiliary information of the terminal device to the network device through the access request message, includes: sending, by the terminal device, the access request message carrying the access auxiliary information to the network device.

Optionally, in an implementation of the first aspect, the sending, by the terminal device, the access request message to the network device, and indicating the access auxiliary information of the terminal device to the network device through the access request message, includes: determining, by the terminal device, a target resource for transmitting the access request message according to the access auxiliary information and a correspondence between a plurality of pieces of access auxiliary information and a plurality of transmission resources; using, by the terminal device, the target resource to send the access request message to the network device, so that the network device determines the access auxiliary information according to the target resource for receiving the access request message and the correspondence.

Optionally, in an implementation of the first aspect, the target resources include at least one of: a time domain resource, a frequency domain resource, a code domain resource, and a space resource.

Optionally, in an implementation of the first aspect, the access request message includes an access preamble sequence or a scheduling request message; or the access request message includes a radio resource control (RRC) connection setup request message, and the access response message includes an RRC connection rejection message; or the access request message includes an RRC connection setup completion message, and the access response message includes an RRC connection release message; or the access request message includes a protocol data unit (PDU), and the access response message includes a PDU.

In a second aspect, there is provided a method for random access method, including: acquiring, by a network device, access auxiliary information of a terminal device; determining, by the network device, access suggestion information corresponding to the access auxiliary information according to the access auxiliary information; and sending, by the network device, an access response message to the terminal device, wherein the access response message includes the access suggestion information.

Optionally, in an implementation of the second aspect, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, in an implementation of the second aspect, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, in an implementation of the second aspect, the access suggestion information includes at least one of: information of a duration during which the terminal device is prohibited from accessing, information of a cell where the network device suggests the terminal device to reside, and information of a network that the network device suggests the terminal device to access.

Optionally, in an implementation of the second aspect, the determining, by the network device, the access suggestion information corresponding to the access auxiliary information according to the access auxiliary information, includes: determining, by the network device, the access suggestion information corresponding to the access auxiliary information according to the access auxiliary information and a first mapping relationship, wherein the first mapping relationship is used for representing a correspondence between a plurality of pieces of access auxiliary information and a plurality of pieces of access suggestion information.

Optionally, in an implementation of the second aspect, the acquiring, by the network device, the access auxiliary information of the terminal device, includes: receiving, by the network device, an access request message sent by the terminal device, wherein the access request message includes the access auxiliary information.

Optionally, in an implementation of the second aspect, the acquiring, by the network device, the access auxiliary information of the terminal device, includes: receiving, by the network device, the access auxiliary information sent by a core network device or another access network device.

Optionally, in an implementation of the second aspect, the acquiring, by the network device, the access auxiliary information of the terminal device, includes: determining, by the network device, the access auxiliary information corresponding to a target resource for receiving the access request message according to the target resource and a correspondence between a plurality of transmission resources and a plurality of pieces of access auxiliary information.

Optionally, in an implementation of the second aspect, the target resources include at least one of: a time domain resource, a frequency domain resource, a code domain resource, and a space resource.

Optionally, in an implementation of the second aspect, the access request message includes a preamble sequence or a scheduling request message; or the access request message includes an RRC connection setup request message, and the access response message includes an RRC connection rejection message; or the access request message includes an RRC connection setup completion message, and the access response message includes an RRC connection release message; or the access request message includes a PDU, and the access response message includes a PDU.

In a third aspect, there is provided a terminal device that may perform operations of the terminal device in the first aspect or any optional implementation of the first aspect. Specifically, the terminal device may include modules used for performing operations of the terminal device in the first aspect or any possible implementation of the first aspect.

In a fourth aspect, there is provided a network device that may perform operations of the network device in the second aspect or any optional implementation of the second aspect. Specifically, the network device may include modules used for performing operations of the network device in the second aspect or any possible implementation of the second aspect.

In a fifth aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the first aspect or any possible implementation of the first aspect, or the execution causes the terminal device to implement the terminal device provided in the third aspect.

In a sixth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the second aspect or any possible implementation of the second aspect, or the execution causes the network device to implement the network device provided in the fourth aspect.

In a seventh aspect, there is provided a computer-readable storage medium storing a program that causes a terminal device to perform any one method for random access in the first aspect and various implementations thereof.

In an eighth aspect, there is provided a computer-readable storage medium storing a program that causes a network device to perform any one method for random access in the second aspect and various implementations thereof.

In a ninth aspect, there is provided a system chip, which includes an input interface, an output interface, a processor, and a memory, wherein the processor is used for executing instructions stored in the memory, and when the instructions are executed, the processor may implement any one method in the first aspect and various implementations thereof.

In a tenth aspect, there is provided a system chip, which includes an input interface, an output interface, a processor, and a memory, wherein the processor is used for executing instructions stored in the memory, and when the instructions are executed, the processor may implement any one method in the second aspect and various implementations thereof.

In an eleventh aspect, there is provided a method for random access, including: sending, by a terminal device, an access request message to a network device; receiving, by the terminal device, an access response message sent by the network device according to the access request message; and determining, by the terminal device, access suggestion information corresponding to access auxiliary information of the terminal device according to the access response message.

Optionally, in an implementation of the eleventh aspect, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, in an implementation of the eleventh aspect, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, in an implementation of the eleventh aspect, the access suggestion information includes at least one of: information of a duration during which the terminal device is prohibited from accessing, information of a cell where the network device suggests the terminal device to reside, and information of a network that the network device suggests the terminal device to access.

Optionally, in an implementation of the eleventh aspect, the determining, by the terminal device, the access suggestion information corresponding to the access auxiliary information of the terminal device according to the access response message, includes: determining, by the terminal device, the access suggestion information corresponding to the access auxiliary information according to the access auxiliary information and a first mapping relationship, wherein the first mapping relationship is used for representing a correspondence between a plurality of pieces of access auxiliary information and a plurality of pieces of access suggestion information.

Optionally, in an implementation of the eleventh aspect, the access response message includes the first mapping relationship; or a broadcast message sent by the network device to the terminal device includes the first mapping relationship; or the first mapping relationship is agreed in advance between the network device and the terminal device.

Optionally, in an implementation of the eleventh aspect, the access request message includes an access preamble sequence or a scheduling request message; or the access request message includes an RRC connection setup request message, and the access response message includes an RRC connection rejection message; or the access request message includes an RRC connection setup completion message, and the access response message includes an RRC connection release message; or the access request message includes a PDU, and the access response message includes a PDU.

In a twelfth aspect, there is provided a method for random access, including: receiving, by a network device, an access request message sent by a terminal device; sending, by the network device, an access response message to the terminal device according to the access request message, wherein the access response message includes a first mapping relationship including a correspondence between a plurality of pieces of access auxiliary information and a plurality of pieces of access suggestion information, so that the terminal device determines access suggestion information corresponding to access auxiliary information of the terminal device according to the access auxiliary information and the first mapping relationship.

Optionally, in an implementation of the twelfth aspect, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, in an implementation of the twelfth aspect, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, in an implementation of the twelfth aspect, the access suggestion information includes at least one of: information of a duration during which the terminal device is prohibited from accessing, information of a cell where the network device suggests the terminal device to reside, and information of a network that the network device suggests the terminal device to access.

Optionally, in an implementation of the twelfth aspect, the access request message includes a preamble sequence or a scheduling request message; or the access request message includes an RRC connection setup request message, and the access response message includes an RRC connection rejection message; or the access request message includes an RRC connection setup completion message, and the access response message includes an RRC connection release message; or the access request message includes a PDU, and the access response message includes a PDU.

In a thirteenth aspect, there is provided a terminal device that may perform operations of the terminal device in the eleventh aspect or any optional implementation of the eleventh aspect. Specifically, the terminal device may include modules used for performing operations of the terminal device in the eleventh aspect or any possible implementation of the eleventh aspect.

In a fourteenth aspect, there is provided a network device that may perform operations of the network device in the twelfth aspect or any optional implementation of the twelfth aspect. Specifically, the network device may include modules used for performing operations of the network device in the twelfth aspect or any possible implementation of the twelfth aspect.

In a fifteenth aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the eleventh aspect or any possible implementation of the eleventh aspect, or the execution causes the terminal device to implement the terminal device provided in the thirteenth aspect.

In a sixteenth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the twelfth aspect or any possible implementation of the twelfth aspect, or the execution causes the network device to implement the network device provided in the fourteenth aspect.

In a seventeenth aspect, there is provided a computer-readable storage medium storing a program that causes a terminal device to perform any one method for random access in the eleventh aspect and various implementations thereof.

In an eighteenth aspect, there is provided a computer-readable storage medium storing a program that causes a network device to perform any one method for random access in the twelfth aspect and various implementations thereof.

In a nineteenth aspect, there is provided a system chip, which includes an input interface, an output interface, a processor, and a memory, wherein the processor is used for executing instructions stored in the memory, and when the instructions are executed, the processor may implement any one method in the eleventh aspect and various implementations thereof.

In a twentieth aspect, there is provided a system chip, which includes an input interface, an output interface, a processor, and a memory, wherein the processor is used for executing instructions stored in the memory, and when the instructions are executed, the processor may implement any one method in the twelfth aspect and various implementations thereof.

BRIEF DESCRIPTION OF DRAWINGS

FIG. 3 is a schematic flowchart of a method for random access according to an implementation of the present disclosure.

FIG. 4 is a schematic flowchart of a method for random access according to an implementation of the present disclosure.

FIG. 5 is a schematic flowchart of a method for random access according to an implementation of the present disclosure.

FIG. 6 is a schematic flowchart of a method for random access according to an implementation of the present disclosure.

DETAILED DESCRIPTION

Hereinafter, technical solutions in the implementations of the present disclosure will be described with reference to the accompanying drawings.

It should be understood that the technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

Various implementations are described herein in connection with terminal devices in the present disclosure. The terminal devices may be referred to as user equipment (UE), access terminals, subscriber units, subscriber stations, mobile stations, mobile platforms, remote stations, remote terminals, mobile devices, user terminals, terminals, wireless communication devices, user agents or user devices. The access terminal may be a cellular phone, a cordless phone, a session initiation protocol (SIP) phone, a wireless local loop (WLL) station, a personal digital auxiliary (PDA), a handheld device with a wireless communication function, a computing device or other processing device connected to a wireless modem, a vehicle-mounted device, a wearable device, a terminal device in a future 5G network, or a terminal device in a future evolving public land mobile network (PLMN), etc.

Various implementations are described herein in connection with network devices in the present disclosure. A network device may be a device for communicating with a terminal device, such as a base station (Base Transceiver Station, referred to as "BTS") in a GSM system or CDMA, a base station (NodeB, referred to as "NB") in a WCDMA system, or an evolved base station (Evolutional Node B, referred to as "eNB" or "eNodeB") in a LTE system, or the network device may be a relay station, an access point, a vehicle-mounted device, a wearable device, a network side device in a future 5G network, or a network side device in a future evolved PLMN network, etc.

Figure 1:
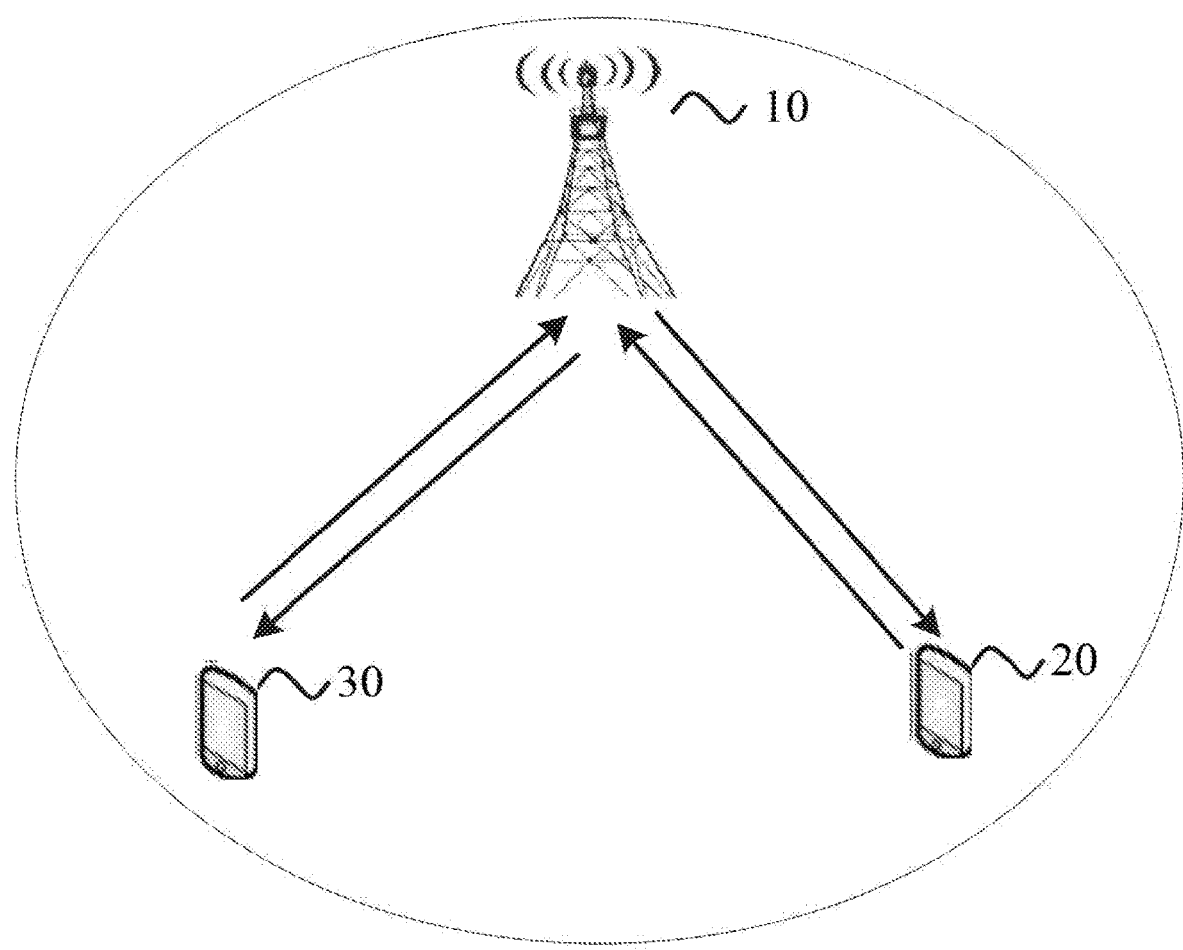
FIG. 1 is a schematic architecture diagram of an application scenario according to an implementation of the present disclosure.

FIG. 1 is a schematic diagram of an application scenario of an implementation of the present disclosure. A communication system in FIG. 1 may include a network device 10, a terminal device 20, and a terminal device 30. The network device 10 is used for providing communication services for the terminal device 20 and the terminal device 30 and accessing to a core network. The terminal device 20 and the terminal device 30 may access the network by searching for a synchronization signal, or a broadcast signal, etc., transmitted by the network device 10 to communicate with the network. Arrows shown in FIG. 1 may represent uplink/downlink transmissions by a cellular link between the terminal device 20 and the network device 10 and a cellular link between the terminal device 30 and the network device 10, respectively.

The network in the implementation of the present disclosure may refer to a Public Land Mobile Network (PLMN) or a device-to-device (D2D) network or a machine-to-machine/ man (M2M) network or other networks. FIG. 1 is a simplified schematic diagram of an example, and other terminal devices may be included in the network and are not shown in FIG. 1.

Figure 2:
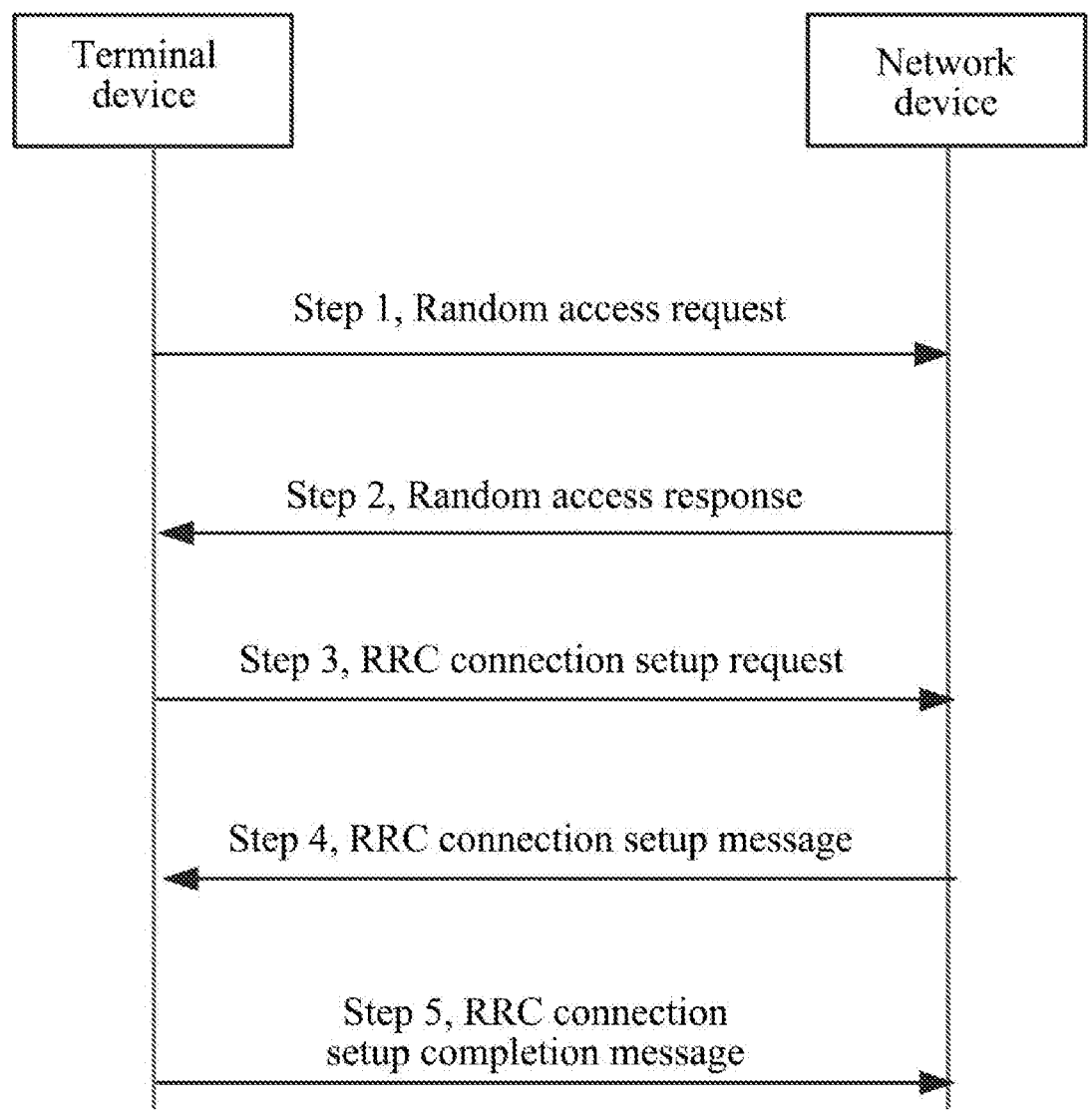
FIG. 2 is a schematic diagram of an interaction flow of random access in the prior art.

FIG. 2 shows a contention-based random access flow in the prior art. As shown in FIG. 2, the random access flow includes the following four steps.

Step 1, a terminal device sends a random access request on a Random Access Channel (RACH), wherein a Random Access Preamble is carried in the random access request.

Step 2, after receiving the random access request sent by the terminal device, a base station sends a Random Access Response (RAR) generated by a Media Access Control (MAC) layer on a Downlink-Synchronization Channel (DL-SCH). The RAR carries a Time Advance (TA), uplink authorization instructions and a cell-radio network temporary identity (C-RNTI).

Step 3, after receiving the RAR, the terminal device determines whether the RAR is an RAR message belonging to it, for example, by using a preamble identity for checking, and after determining that the RAR belongs to it, an RRC layer of the terminal device generates an RRC connection setup request message and maps it onto a Common Control Channel (CCCH) in an Uplink-Synchronization Channel (UL-SCH) for transmission to the base station, wherein an Identity (ID) of the terminal device is carried.

Step 4, an RRC layer of the base station generates an RRC connection setup resolution message and maps it onto a CCCH in a DL-SCH or a Dedicated Control Channel (DCCH) for transmission to the terminal device. After the terminal device correctly receives the RRC connection setup resolution message, a contention-based random access procedure is completed. The RRC connection setup resolution message includes an RRC connection setup message.

Step 5, the terminal device sends an acknowledgment message to the base station to acknowledge that the RRC connection setup resolution message is valid, wherein the acknowledgment message includes an RRC connection setup completion message.

In the random access procedure, a random access prefix in Step 1 and the random access response (RAR) in Step 2 are low-level messages, which are not visible to a network layer (i.e., a third layer L3). Therefore, in signaling tracking, a first signaling for the terminal device to access the network is the RRC connection setup request message in Step 3.

For different scenarios, the RRC connection setup request message in Step 3 may include different contents. For example, for an initial access scenario, an RRC connection setup request message carries an RRC connection request generated by an RRC layer, wherein the RRC connection request carries a serving-temporary mobile subscriber identity (S-TMSI) or a random number of a terminal device; for a connection reestablishment scenario, an RRC connection setup request message carries an RRC connection reestablishment request generated by an RRC layer, a C-RNTI, and Protocol Control Information (PCI); for a handover scenario, an RRC connection setup request message carries an RRC handover completion message generated by an RRC layer and a C-RNTI of a UE; and for a scenario of arrival of uplink/downlink data, an RRC connection setup request message carries a C-RNTI of a terminal device.

In the LTE system, if a current network is congested, after a terminal device initiates an RRC connection setup request, a network device will reject an access of the terminal through an RRC connection rejection message; or the network device releases the terminal device that has set up an RRC connection through an RRC connection release message, and indicates to the terminal device that the network is congested. However, when the network device rejects the access of the terminal device, it releases all conflicting terminal devices or all services. These terminal devices will try to re-access after being rejected by the network device. When the quantity of terminals is large, an access success rate of the terminal device is very low.

In the implementation of the present disclosure, it is proposed to perform fine access control management on a terminal device, and guide re-accesses of different terminal devices respectively through access auxiliary information of different terminal devices, which can reduce a probability of conflict in an access process of the terminal device and improve the success rate of random access of the terminal device.

FIG. 3 is a schematic flowchart of a method 300 for random access according to an implementation of the present disclosure. The method 300 may be performed by a terminal device. As shown in FIG. 3, a specific flow of the random access includes acts 310 and 320.

In 310, a terminal device sends an access request message to a network device, and indicates access auxiliary information of the terminal device to the network device through the access request message.

That is, the terminal device sends the access request message to the network device, and the access request message indicates the access auxiliary information of the terminal device, which is used for assisting the terminal device to perform random access. The terminal device may carry the access auxiliary information of the terminal device in the access request message and send it to the network device; or the access auxiliary information may be indicated to the network device by indirect indication, for example, by information of a resource for transmitting the access request message.

Optionally, the terminal device sends the access request message to the network device and indicates the access auxiliary information of the terminal device to the network device through the access request message, including that: the terminal device sends the access request message carrying the access auxiliary information to the network device.

Optionally, the terminal device sends the access request message to the network device and indicates the access auxiliary information of the terminal device to the network device through the access request message, including that: the terminal device determines a target resource for transmitting the access request message according to the access auxiliary information and a correspondence between a plurality of pieces of access auxiliary information and a plurality of transmission resources; the terminal device uses the target resource to send the access request message to the network device, so that the network device determines the access auxiliary information according to the target resource for receiving the access auxiliary information and the correspondence.

In the implementation, the target resource may include a time domain resource, a frequency domain resource, a code domain resource, and a space resource, etc. The terminal device determines the target resource, corresponding to the access auxiliary information, for transmitting the access request message according to its own access auxiliary information, thereby sending the access request message to the network device on the target resource. After receiving the access request message, the network device determines access auxiliary information corresponding to the target resource as access auxiliary information of the terminal device according to the target resource used by the access request message and the correspondence between the plurality of pieces of access auxiliary information and the plurality of transmission resources.

Optionally, the access auxiliary information of the terminal device may include at least one of the following information: access information of the terminal device, device information of the terminal device, service information of the terminal device, a type of a bearer set up by the terminal device, a data stream for transmitting the access request message, and a logical channel for transmitting the access request message.

The access information of the terminal device includes, for example, an access level of the terminal device; the device information of the terminal device includes, for example, a priority of the terminal device and/or a device type of the terminal device; the service information of the terminal device includes, for example, at least one of the following information: a service application level of the terminal device, a service quality level of the terminal device, a reason why the terminal device sets up the service, core network information (such as a core network type, a core network identity, a PLMN identity, etc.) of the terminal device setting up the service, and a service type of the service.

Optionally, the access request message may be a preamble sequence sent by the terminal device to the network device or a scheduling request message sent by the terminal device; or the access request message may be a first RRC message, such as an RRC connection setup request message, sent by the terminal device to the network device in a random access procedure; or the access request message may be a second RRC message, such as an RRC connection setup completion message, sent by the terminal device to the network device in a random access procedure; or the access request message may be a message, such as a message carried in a MAC PDU, sent by the terminal device through a Protocol Data Unit (PDU) of a data link layer (a second layer L2).

In 320, the terminal device receives an access response message sent by the network device according to the access request message, wherein the access response message includes indication information for indicating rejection of access of the terminal device, and the indication information includes access suggestion information corresponding to the access auxiliary information.

Specifically, after the terminal device sends the access request message to the network device, the network device may obtain access auxiliary information of the terminal device from the access request message, and the network device may determine whether to allow the access of the terminal device according to the access auxiliary information and a current network congestion situation.

For example, the network device may determine which terminal devices are allowed to access or which terminal devices are denied to access according to access levels of different terminal devices and the network congestion situation. If the current network congestion situation is relatively light, the network device may only deny access of those terminal devices with lower access levels, send an access response message to these terminal devices, carry indication information for indicating rejection of access of a terminal device in the access response message, and configure the terminal devices with access suggestion information corresponding to access auxiliary information of the terminal devices through the indication information, for example, information such as time when the terminal devices are forbidden to attempt access subsequently; if the current network congestion situation is very serious, the network device may reject all conflicting terminal devices that request access.

The indication information carried in the access response message includes access suggestion information corresponding to the access auxiliary information. Further, the indication information may also include access auxiliary information of the terminal device, for example, information such as a priority or an access level of the terminal device.

Optionally, the access suggestion information includes at least one of the following information: information of a duration during which the terminal device is prohibited from accessing, information of a cell where the network device suggests the terminal device to reside, and information of a network that the network device suggests the terminal device to access.

The access suggestion information is relevant information configured by the network device for the terminal device to guide the terminal device to access again, such as information of access time, information of an access network, or information of a resident cell.

For example, if the access suggestion information includes information of the duration during which the terminal device is prohibited from accessing (also referred to as a backoff time in the implementation of the present disclosure), after receiving the access response message sent by the network device, the terminal device may initiate access to the network device again according to the information of the duration during which the access is prohibited carried in the access response message after the duration elapses from the time when the access response message is received. That is, after receiving the access response message sent by the network device, the terminal device does not initiate an access request within the duration, configured by the network device, during which the terminal device is prohibited from accessing, and the terminal device may continue to initiate an access only after the duration expires.

For another example, if the access suggestion information includes the information of the cell in which the network device suggests the terminal device to reside, the terminal device may attempt to reside in the cell according to the information of the cell carried in access suggestion information after receiving the access response message sent by the network device. For example, the cell may be other cells with less congestion.

For another example, if the access suggestion information includes information of the network that the network device suggests the terminal device to access, the terminal device may initiate an access request in the network according to the information of network carried in access suggestion information after receiving the access response message sent by the network device. For example, the network may be other networks with less congestion.

Optionally, the access response message may be an RRC connection rejection message, an RRC connection release message or a PDU received by the terminal device from the network device, or the access response message may be any uplink message such as a control message or service data, which is not limited in the implementation of the present disclosure. For example, if the access request message sent by the terminal device to the network device is an RRC connection setup request message sent by the terminal device to the network device in the random access procedure, the access response message sent by the network device received by the terminal device may be an RRC connection rejection message; if the access request message sent by the terminal device to the network device is an RRC connection setup completion message sent by the terminal device to the network device in the random access procedure, the access response message sent by the network device received by the terminal device may be an RRC connection release message; if the access request message sent by the terminal device to the network device is a message sent through a protocol data unit (PDU) of a data link layer, such as a message carried in a MAC PDU, then the access response message sent by the network device received by the terminal device may be a message sent through the protocol data unit (PDU) of the data link layer, such as a message carried in the MAC PDU.

Therefore, in the implementation of the present disclosure, the terminal device sends its own access auxiliary information to the network device and obtaining access suggestion information corresponding to the access auxiliary information from the access response message sent by the network device, thereby reducing a probability of collision between the terminal device and other terminal devices when the terminal device re-accesses and improving the success rate of random access of the terminal device.

FIG. 4 is a flowchart of a method 400 for random access according to an implementation of the present disclosure. The method 400 may be performed by a network device. As shown in FIG. 4, a specific flow of the random access includes acts 410-430.

In 410, a network device acquires access auxiliary information of a terminal device.

The access auxiliary information is used for assisting the terminal device to perform random access. Optionally, the access auxiliary information of the terminal device may include at least one of the following information: access information of the terminal device, device information of the terminal device, service information of the terminal device, a type of a bearer set up by the terminal device, a data stream for transmitting an access request message, and a logical channel for transmitting the access request message.

The access information of the terminal device includes, for example, an access level of the terminal device; the device information of the terminal device includes, for example, a priority of the terminal device and/or a device type of the terminal device; the service information of the terminal device includes, for example, at least one of the following information: a service application level of the terminal device, a service quality level of the terminal device, a reason why the terminal device sets up the service, core network information (such as a core network type, a core network identity, a PLMN identity, etc.) of the terminal device setting up the service, and a service type of the service.

Optionally, the network device acquires the access auxiliary information of the terminal device, including that: the network device receives an access request message sent by the terminal device, and the access request message includes the access auxiliary information.

That is, when the terminal device sends the access request message to the network device, the terminal device may carry the access auxiliary information of the terminal device in the access request message, so that the network device may configure the terminal device with an appropriate backoff time or an appropriate access cell or an appropriate access network, etc. according to the received access auxiliary information.

Optionally, the access request message may be a preamble sequence received by the network device from the terminal device or a scheduling request message sent by the terminal device; or the access request message may be a first RRC message received by the network device from the terminal device, such as an RRC connection setup request message; or the access request message may be a second RRC message received by the network device from the terminal device, such as an RRC connection setup completion message; or the access request message may be a message received by the network device from the terminal device through a Protocol Data Unit (PDU) of a data link layer (a second layer L2), such as a message carried in a MAC PDU.

Optionally, the network device acquires the access auxiliary information of the terminal device, including that: the network device receives the access auxiliary information sent by a core network or another access network device.

Specifically, the network device may acquire the access auxiliary information of the terminal device from a corresponding core network, or acquire the access auxiliary information of the terminal device from another access network device. When the terminal device communicates with the core network or another access network device, the core network or the other access network device may acquire and record the access auxiliary information of the terminal device, so that the network device may acquire access auxiliary information of different terminal devices from the core network or other access network devices. The core network device or the other access network device may actively send the access auxiliary information of the terminal device to the network device in a process of interacting with the network device, or the network device may send a request message to the core network device or the other access network device to request to acquire the access auxiliary information. For example, the network device may send a request message for requesting the access auxiliary information to the core network device and receive the access auxiliary information sent by the core network device according to the request message; or the network device may send a request message for requesting access auxiliary information to another access network device and receive the access auxiliary information sent by the other access network device according to the request message.

Optionally, the network device acquires the access auxiliary information of the terminal device, including that: the network device determines the access auxiliary information corresponding to a target resource for receiving the access request message according to the target resource and a correspondence between a plurality of transmission resources and a plurality of pieces of access auxiliary information.

Optionally, the target resource includes at least one of: a time domain resource, a frequency domain resource, a code domain resource, and a space resource. The terminal device determines the target resource, corresponding to the access auxiliary information, for transmitting the access request message according to its own access auxiliary information, thereby sending the access request message to the network device on the target resource. After receiving the access request message, the network device determines access auxiliary information corresponding to the target resource as access auxiliary information of the terminal device according to the target resource used by the access request message and the correspondence between the plurality of pieces of access auxiliary information and the plurality of transmission resources.

In 420, the network device determines access suggestion information corresponding to the access auxiliary information according to the access auxiliary information.

Optionally, the access suggestion information includes at least one of the following information: information of a duration during which the terminal device is prohibited from accessing, information of a cell where the network device suggests the terminal device to reside, and information of a network that the network device suggests the terminal device to access.

The access suggestion information is relevant information configured by the network device for the terminal device to guide the terminal device to access again, such as information of access time, information of an access network, or information of a resident cell.

Optionally, the network device determines the access suggestion information corresponding to the access auxiliary information according to the access auxiliary information, including that: the network device determines the access suggestion information corresponding to the access auxiliary information according to the access auxiliary information and a first mapping relationship, wherein the first mapping relationship is used for representing a correspondence between a plurality of pieces of access auxiliary information and a plurality of pieces of access suggestion information.

Specifically, access auxiliary information of different terminal devices may be different, and the different pieces of access auxiliary information correspond to different pieces of access suggestion information. The network device may determine access suggestion information corresponding to the access auxiliary information of the terminal device for the terminal device according to the access auxiliary information of the terminal device. For example, the first mapping relationship shown in Table 1 includes the correspondence between the plurality of pieces of access auxiliary information and the plurality of pieces of access suggestion information. For example, the access auxiliary information is an access level of the terminal device, and access suggestion information is backoff time, i.e., a duration during which the terminal device is prohibited from accessing. If the access level of the terminal device acquired by the network device belongs to level I, then the backoff time of the terminal device is T1; if the access level of the terminal device belongs to level II, then the backoff time of the terminal device is T2; if the access level of the terminal device belongs to level III, then the backoff time of the terminal device is T3; if the access level of the terminal device belongs to level IV, then the backoff time of the terminal device is T4. The access level I to the access level IV of the terminal device decrease in turn, and the backoff time T1 to T4 of the terminal device increase in turn, i.e., the lower the level is, the longer the backoff time is.

TABLE 1

| Access auxiliary information (Access level) | Access suggestion information (Backoff time) |
|---|---|
| Level I | T1 |
| Level II | T2 |
| Level III | T3 |
| Level IV | T4 |

It should be understood that the correspondence between the plurality of pieces of access auxiliary information and the plurality of pieces of access suggestion information may be presented, for example, through tables, formulas, images, etc., and in the correspondence, the plurality of pieces of access auxiliary information and the plurality of pieces of access suggestion information may be one-to-one correspondence; one type of access auxiliary information may correspond to a plurality of pieces of access suggestion information; or a piece of access suggestion information may correspond to multiple types of access auxiliary information. That is, the network device may determine the access suggestion information corresponding to the access auxiliary information of the terminal device, for example, by looking up a predetermined table including a correspondence between a plurality of pieces of access auxiliary information and a plurality of pieces of access suggestion information, such as Table 1, which includes the information of the correspondence between the plurality of pieces of access auxiliary information and the plurality of pieces of access suggestion information; or, the terminal device may acquire the access suggestion information corresponding to the access auxiliary information through calculation by using a predetermined formula between relevant parameters in the access auxiliary information and relevant parameters in the access suggestion information. The present disclosure is not limited to this.

In 430, the network device sends an access response message to the terminal device, and the access response message includes the access suggestion information.

Optionally, the access response message may be an RRC connection rejection message, an RRC connection release message or a PDU sent by the network device to the terminal device, or the access response message may be any uplink message such as a control message or service data, which is not limited in the implementation of the present disclosure. For example, if the access request message received by the network device from the terminal device is an RRC connection setup request message sent by the terminal device to the network device in a random access procedure, the access response message sent by the network device to the terminal device may be an RRC connection rejection message; if the access request message received by the network device from the terminal device is an RRC connection setup completion message sent by the terminal device to the network device in the random access procedure, the access response message sent by the network device to the terminal device may be an RRC connection release message; if the access request message received by the network device from the terminal device is a message sent through a protocol data unit (PDU) of a data link layer, such as a message carried in a MAC PDU, then the access response message sent by the network device to the terminal device may be a message sent through the PDU of the data link layer, such as a message carried in the MAC PDU.

Therefore, in the implementation of the present disclosure, the network device configures access suggestion information corresponding to respective access auxiliary information for different terminal devices, thereby reducing a probability of collision between the terminal device and other terminal devices when the terminal device re-accesses and improving the success rate of random access of the terminal device.

FIG. 5 is a flowchart of a method 500 for random access according to an implementation of the present disclosure. The method 500 may be performed by a terminal device. As shown in FIG. 5, a specific flow of the random access includes acts 510-530.

In 510, a terminal device sends an access request message to a network device.

Optionally, the access request message may be a preamble sequence sent by the terminal device to the network device or a scheduling request message sent by the terminal device; or the access request message may be a first RRC message, such as an RRC connection setup request message, sent by the terminal device to the network device in a random access procedure; or the access request message may be a second RRC message, such as an RRC connection setup completion message, sent by the terminal device to the network device in a random access procedure; or the access request message may be a message sent by the terminal device through a PDU of a data link layer, such as a message carried in a MAC PDU.

In 520, the terminal device receives an access response message sent by the network device according to the access request message.

In 530, the terminal device determines access suggestion information corresponding to access auxiliary information of the terminal device according to the access response message.

The auxiliary information is used for assisting the terminal device to perform random access. Optionally, the access auxiliary information of the terminal device may include at least one of the following information: access information of the terminal device, device information of the terminal device, service information of the terminal device, a type of a bearer set up by the terminal device, a data stream for transmitting an access request message, and a logical channel for transmitting the access request message.

The access information of the terminal device includes, for example, an access level of the terminal device; the device information of the terminal device includes, for example, a priority of the terminal device and/or a device type of the terminal device; the service information of the terminal device includes, for example, at least one of the following information: a service application level of the terminal device, a service quality level of the terminal device, a reason why the terminal device sets up the service, core network information (such as a core network type, a core network identity, a PLMN identity, etc.) of the terminal device setting up the service, and a service type of the service.

Optionally, the access suggestion information may include at least one of the following information: information of a duration during which the terminal device is prohibited from accessing, information of a cell where the network device suggests the terminal device to reside, and information of a network that the network device suggests the terminal device to access.

For example, if the access suggestion information is information of a duration during which the terminal device is prohibited from accessing (also referred to as backoff time), then the terminal device may, after determining its access suggestion information, initiate access to the network device again according to the information of the duration during which the access is prohibited carried in the access suggestion message after the duration elapses from the time when the access response message is received. That is, after receiving the access response message sent by the network device, the terminal device does not initiate an access request within the duration, configured by the network device, in which the terminal device is prohibited from accessing, and the terminal device may continue to initiate an access only after the duration expires.

For another example, if the access suggestion information is information of a cell in which the network device suggests the terminal device to reside, the terminal device may attempt to reside in the cell according to the information of the cell carried in the access suggestion information after determining its access suggestion information. The cell is, for example, other cell with less congestion.

For another example, if the access suggestion information is information of a network that the network device suggests the terminal device to access, the terminal device may initiate an access request in the network according to the information of the network carried in the access suggestion information after determining its access suggestion information. The network is, for example, other less congested network.

Optionally, the terminal device determines the access suggestion information corresponding to the access auxiliary information of the terminal device according to the access response message, including that: the terminal device determines the access suggestion information corresponding to the access auxiliary information according to the access auxiliary information and a first mapping relationship, wherein the first mapping relationship is used for representing the correspondence between a plurality of pieces of access auxiliary information and a plurality of pieces of access suggestion information.

Specifically, access auxiliary information of different terminal devices may be different, and the different pieces of access auxiliary information correspond to different pieces of access suggestion information. The terminal device may determine the access suggestion information corresponding to the access auxiliary information according to the access auxiliary information of the terminal device and the first mapping relationship. For example, the first mapping relationship shown in Table 2 includes the correspondence between the plurality of pieces of access auxiliary information and the plurality of pieces of access suggestion information. For example, access auxiliary information is a service type of the terminal device and access suggestion information is backoff time of the terminal device. If the service type of the terminal device is voice, the terminal device may determine its own backoff time to be T1; if the service type of the terminal device is an image, the terminal device determines its own backoff time to be T2; if the service type of the terminal device is video, the terminal device determines its own backoff time to be T3.

TABLE 2

| Access auxiliary information (Service type) | Access suggestion information (Backoff time) |
| --- | --- |
| Voice | T1 |
| Image | T2 |
| Video | T3 |

Optionally, the access response message includes the first mapping relationship; or a broadcast message sent by the network device to the terminal device includes the first mapping relationship; or the first mapping relationship is agreed in advance between the network device and the terminal device.

That is, the terminal device may acquire information of the first mapping relationship from the access response message sent by the network device; or the network device may broadcast the first mapping relationship to the terminal device by sending a broadcast message, and the terminal device may acquire the information of the first mapping relationship from the broadcast information sent by the network device; or the first mapping relationship may be previously agreed between the network device and the terminal device, for example, as specified in a protocol.

Optionally, the access response message may be an RRC connection rejection message, an RRC connection release message or a PDU received by the terminal device from the network device, or the access response message may be any uplink message such as a control signaling or service data, which is not limited in the implementation of the present disclosure. For example, if the access request message sent by the terminal device to the network device is an RRC connection setup request message sent by the terminal device to the network device in the random access procedure, the access response message sent by the network device received by the terminal device may be an RRC connection rejection message; if the access request message sent by the terminal device to the network device is an RRC connection setup completion message sent by the terminal device to the network device in the random access procedure, the access response message sent by the network device received by the terminal device may be an RRC connection release message; if the access request message sent by the terminal device to the network device is a message sent through a protocol data unit (PDU) of a data link layer, such as a message carried in a MAC PDU, then the access response message sent by the network device received by the terminal device may be a message sent through the protocol data unit (PDU) of the data link layer, such as a message carried in the MAC PDU.

Therefore, in the implementation of the present disclosure, the terminal device determines the access suggestion information corresponding to the access auxiliary information in the random access procedure, so that the terminal device can re-access according to the access suggestion information, and the probability of conflict between the terminal device and other terminal devices when re-accessing is reduced, and the success rate of random access by the terminal device is improved.

FIG. 6 is a flowchart of a method 600 for random access according to an implementation of the present disclosure. The method 600 may be performed by a network device. As shown in FIG. 6, a specific flow of the random access includes acts 610-620.

In 610, a network device acquires an access request message of a terminal device.

In 620, the network device sends an access response message to the terminal device according to the access request message.

The access response message includes a first mapping relationship including a correspondence between a plurality of pieces of access auxiliary information and a plurality of pieces of access suggestion information, so that the terminal device determines access suggestion information corresponding to access auxiliary information of the terminal device according to the access auxiliary information and the first mapping relationship.

Specifically, after receiving the access request message sent by the terminal device, the network device sends an access response message to the terminal device, and a first mapping relationship is carried in the access response message, wherein the first mapping relationship includes a correspondence between a plurality of pieces of access auxiliary information and a plurality of pieces of access suggestion information; and after receiving the access response message, the terminal device may determine corresponding access suggestion information according to its own access auxiliary information and the first mapping relationship. The auxiliary information is used for assisting the terminal device to perform random access.

Optionally, the access auxiliary information of the terminal device may include at least one of the following information: access information of the terminal device, device information of the terminal device, service information of the terminal device, a type of a bearer set up by the terminal device, a data stream for transmitting an access request message, and a logical channel for transmitting the access request message.

The access information of the terminal device includes, for example, an access level of the terminal device; the device information of the terminal device includes, for example, a priority of the terminal device and/or a device type of the terminal device; the service information of the terminal device includes, for example, at least one of the following information: a service application level of the terminal device, a service quality level of the terminal device, a reason why the terminal device sets up the service, core network information (such as a core network type, a core network identity, a PLMN identity, etc.) of the terminal device setting up the service, and a service type of the service.

Optionally, the access suggestion information may include at least one of the following information: information of a duration during which the terminal device is prohibited from accessing, information of a cell where the network device suggests the terminal device to reside, and information of a network that the network device suggests the terminal device to access.

For example, if the access suggestion information is information of a duration during which the terminal device is prohibited from accessing (also referred to as backoff time in the present disclosure), then the terminal device may, after determining its access suggestion information, initiate access to the network device again according to the information of the duration during which the access is prohibited carried in the access suggestion message after the duration elapses from the time when the access response message is received. That is, after receiving the access response message sent by the network device, the terminal device does not initiate an access request within the duration, configured by the network device, in which the terminal device is prohibited from accessing, and the terminal device may continue to initiate an access only after the duration expires.

For another example, if the access suggestion information is information of a cell in which the network device suggests the terminal device to reside, the terminal device may attempt to reside in the cell according to the information of the cell carried in the access suggestion information after determining its access suggestion information. The cell is, for example, other cell with less congestion.

For another example, if the access suggestion information is information of a network that the network device suggests the terminal device to access, the terminal device may initiate an access request in the network according to the information of the network carried in the access suggestion information after determining its access suggestion information. The network is, for example, other less congested network.

Optionally, the access request message may be a preamble sequence sent by the terminal device to the network device or a scheduling request message sent by the terminal device; or the access request message may be a first RRC message, such as an RRC connection setup request message, sent by the terminal device to the network device in a random access procedure; or the access request message may be a second RRC message, such as an RRC connection setup completion message, sent by the terminal device to the network device in a random access procedure; or the access request message may be a message sent by the terminal device through a PDU of a data link layer, such as a message carried in a MAC PDU.

Optionally, the access response message may be an RRC connection rejection message, an RRC connection release message or a PDU received by the terminal device from the network device, or the access response message may be any uplink message such as a control message or service data, which is not limited in the implementation of the present disclosure. For example, if the access request message sent by the terminal device to the network device is an RRC connection setup request message sent by the terminal device to the network device in the random access procedure, the response message sent by the network device received by the terminal device may be an RRC connection rejection message; if the access request message sent by the terminal device to the network device is an RRC connection setup completion message sent by the terminal device to the network device in the random access procedure, the response message sent by the network device received by the terminal device may be an RRC connection release message; if the access request message sent by the terminal device to the network device is a message sent through a protocol data unit (PDU) of a data link layer, such as a message carried in a MAC PDU, then the response message sent by the network device received by the terminal device may be a message sent through the PDU of the data link layer, such as a message carried in the MAC PDU.

Therefore, in the implementation of the present disclosure, the network device informs the terminal device of the correspondence between the access auxiliary information and the access suggestion information in a process of sending, by the network device, the access response message information to the terminal device, so that the terminal device can acquire access suggestion information corresponding to respective access auxiliary information, thereby reducing a probability of collision between the terminal device and other terminal devices when the terminal device re-accesses and improving the success rate of random access of the terminal device.

Figure 7:
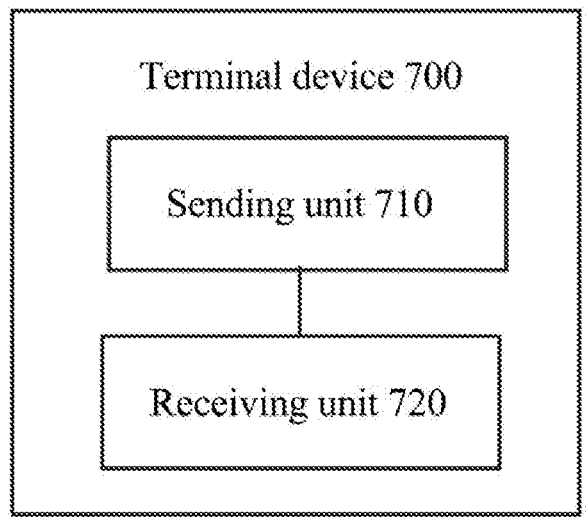
FIG. 7 is a schematic structural diagram of a terminal device according to an implementation of the present disclosure.

FIG. 7 is a schematic block diagram of a terminal device 700 according to an implementation of the present disclosure. As shown in FIG. 7, the terminal device 700 includes a sending unit 710 and a receiving unit 720.

The sending unit 710 is used for sending an access request message to a network device and indicating access auxiliary information of the terminal device to the network device through the access request message.

The receiving unit 720 is used for receiving an access response message sent by the network device according to the access request message, wherein the access response message includes indication information for indicating rejection of access of the terminal device, and the indication information includes access suggestion information corresponding to the access auxiliary information.

Therefore, the terminal device sends its own access auxiliary information to the network device and obtaining access suggestion information corresponding to the access auxiliary information from the access response message sent by the network device, thereby reducing a probability of collision between the terminal device and other terminal devices when the terminal device re-accesses and improving the success rate of random access of the terminal device.

Optionally, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, the access suggestion information includes at least one of: information of a duration during which the terminal device is prohibited from accessing, information of a cell where the network device suggests the terminal device to reside, and information of a network that the network device suggests the terminal device to access.

Optionally, the sending unit 710 is specifically used for sending the access request message carrying the access auxiliary information to the network device.

Optionally, the sending unit 710 is specifically used for determining a target resource for transmitting the access request message according to the access auxiliary information and a correspondence between a plurality of pieces of access auxiliary information and a plurality of transmission resources; and using the target resource to send the access request message to the network device, so that the network device determines the access auxiliary information according to the target resource for receiving the access request message and the correspondence.

Optionally, the target resource includes at least one of: a time domain resource, a frequency domain resource, a code domain resource, and a space resource.

Optionally, the access request message includes an access preamble sequence or a scheduling request message; or the access request message includes a radio resource control (RRC) connection setup request message, and the access response message includes an RRC connection rejection message; or the access request message includes an RRC connection setup completion message, and the access response message includes an RRC connection release message; or the access request message includes a protocol data unit (PDU), and the access response message includes a PDU.

It should be understood that the terminal device 700 may correspond to the terminal device in the method implementation and may realize the corresponding functions of the terminal device. For the sake of brevity, it will not be repeated here.

Figure 8:
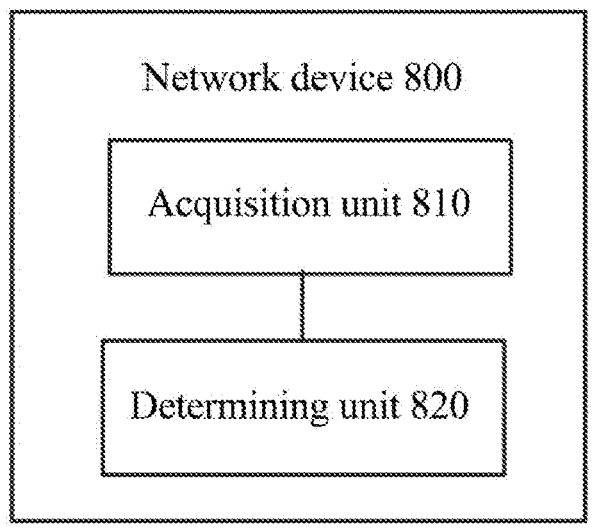
FIG. 8 is a schematic structural diagram of a network device according to an implementation of the present disclosure.

FIG. 8 is a schematic block diagram of a network device 800 according to an implementation of the present disclosure. As shown in FIG. 8, the network device 800 includes an acquisition unit 810, a determining unit 820, and a sending unit 830.

The acquisition unit 810 is used for acquiring access auxiliary information of a terminal device.

The determining unit 820 is used for determining access suggestion information corresponding to the access auxiliary information according to the access auxiliary information acquired by the acquisition unit.

The sending unit 830 is used for sending an access response message to the terminal device, wherein the access response message includes the access suggestion information.

Therefore, the network device configures access suggestion information corresponding to respective access auxiliary information for different terminal devices, thereby reducing a probability of collision between the terminal device and other terminal devices when the terminal device re-accesses and improving the success rate of random access of the terminal device.

Optionally, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, the access suggestion information includes at least one of: information of a duration during which the terminal device is prohibited from accessing, information of a cell where the network device suggests the terminal device to reside, and information of a network that the network device suggests the terminal device to access.

Optionally, the determining unit 820 is specifically used for determining the access suggestion information corresponding to the access auxiliary information according to the access auxiliary information and a first mapping relationship, wherein the first mapping relationship is used for representing a correspondence between a plurality of pieces of access auxiliary information and a plurality of pieces of access suggestion information.

Optionally, the acquisition unit 810 is specifically used for receiving an access request message sent by the terminal device, wherein the access request message includes the access auxiliary information.

Optionally, the acquisition unit 810 is specifically used for receiving the access auxiliary information sent by a core network or another access network device.

Optionally, the acquisition unit 810 is specifically used for sending a request message for requesting the access auxiliary information to the core network device, and receiving the access auxiliary information sent by the core network device according to the request message; or sending a request message to the other access network device, and receiving the access auxiliary information sent by the other access network device according to the request message.

Optionally, the acquisition unit 810 is specifically used for determining the access auxiliary information corresponding to a target resource for receiving the access request message according to the target resource and a correspondence between a plurality of transmission resources and a plurality of pieces of access auxiliary information.

Optionally, the target resource includes at least one of: a time domain resource, a frequency domain resource, a code domain resource, and a space resource.

Optionally, the access request message includes a preamble sequence or a scheduling request message; or the access request message includes a radio resource control (RRC) connection setup request message, and the access response message includes an RRC connection rejection message; or the access request message includes an RRC connection setup completion message, and the access response message includes an RRC connection release message; or the access request message includes a protocol data unit (PDU), and the access response message includes a PDU.

Figure 9:
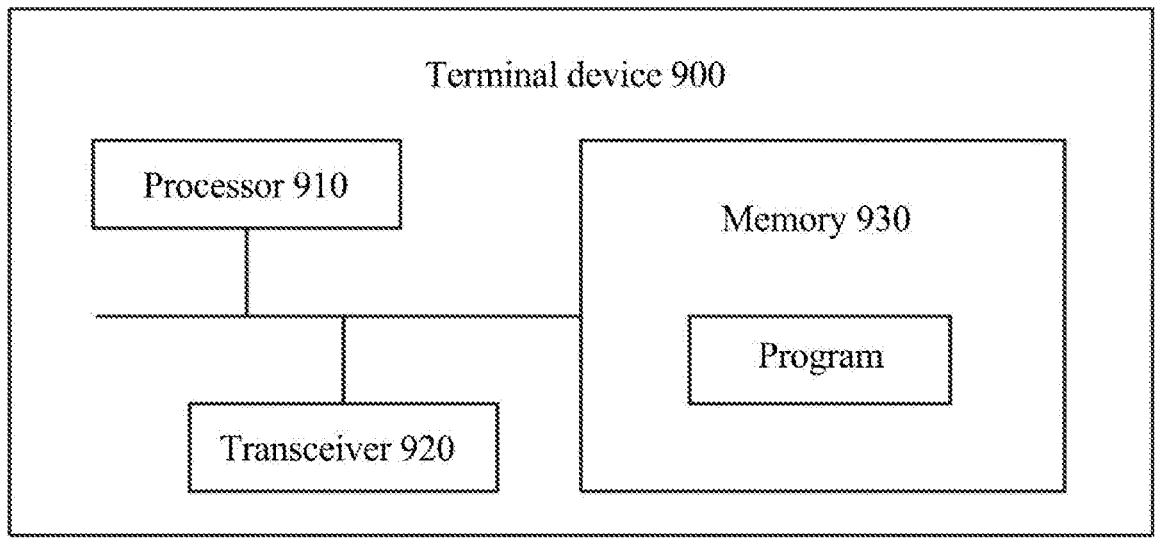
FIG. 9 is a schematic structural diagram of a terminal device according to an implementation of the present disclosure.

FIG. 9 is a schematic structural diagram of a terminal device 900 according to an implementation of the present disclosure. As shown in FIG. 9, the terminal device includes a processor 910, a transceiver 920, and a memory 930, wherein the processor 910, the transceiver 920, and the memory 930 communicate with each other through an internal connection path. The memory 930 is used for storing instructions, and the processor 910 is used for executing instructions stored in the memory 930 to control the transceiver 920 to send or receive signals.

Optionally, the processor 910 may call the program codes stored in the memory 930 to perform corresponding operations of the terminal device in the method 300 shown in FIG. 3, which will not be described here repeatedly for brevity.

It should be understood that, in an implementation of the present disclosure, the processor 910 may be a central processing unit (CPU), or the processor 910 may be other general purpose processor, a digital signal processor (DSP), an application specific integrated circuit (ASIC), a field programmable gate array (FPGA), or other programmable logic device, a discrete gate or a transistor logic device, or a discrete hardware component, etc. The general purpose processor may be a microprocessor, or the processor may be any conventional processor or the like.

The memory 930 may include a read only memory and a random access memory and provide instructions and data to the processor 910. A portion of memory 930 may also include a non-volatile random access memory. For example, the memory 930 may also store device type information.

In an implementation process, the acts of the methods described above may be accomplished by integrated logic circuits of hardware in the processor 910 or instructions in a form of software. The acts of the method disclosed in the implementation of the present disclosure may be directly accomplished by an execution of a hardware processor or accomplished by a combination of hardware and software modules in the processor 910. The software modules may be located in typical storage medium in the art, such as a random access memory, flash memory, read-only memory, programmable read-only memory or electrically erasable programmable memory, or register. The storage medium is located in the memory 930, and the processor 910 reads the information in the memory 930 and accomplishes the acts of the above method in combination with its hardware. In order to avoid repetition, it will not be described in detail here.

The terminal device 900 according to the implementation of the present disclosure may correspond to the terminal device for executing the method 300 in the method 300 and the terminal device 700 according to the implementation of the present disclosure, and various units or modules in the terminal device 900 are respectively used for executing various actions or processing processes executed by the terminal device in the method 300. Here, in order to avoid redundancy, detailed description thereof is omitted.

Figure 10:
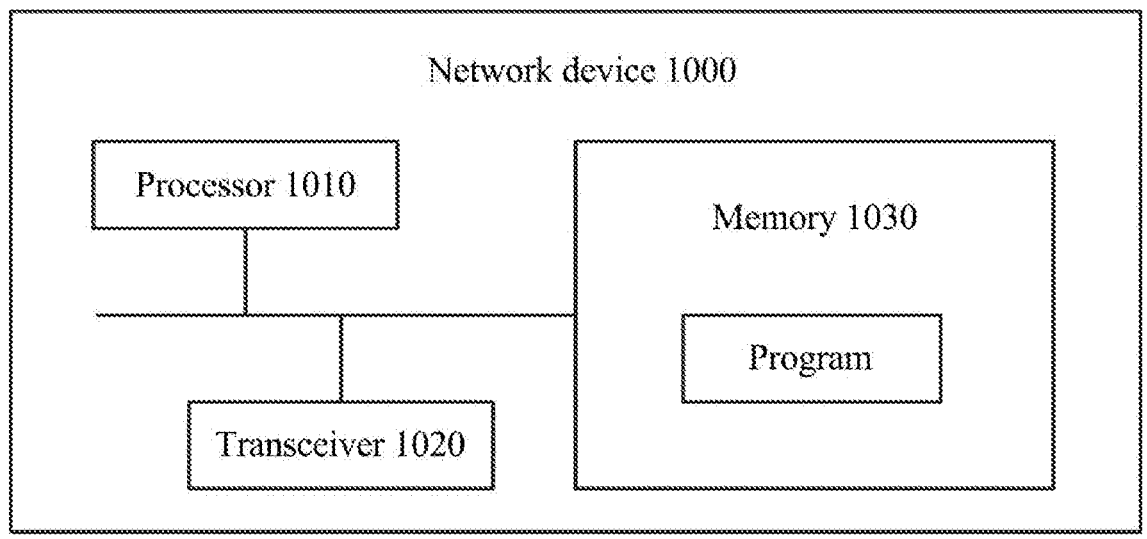
FIG. 10 is a schematic structural diagram of a network device according to an implementation of the present disclosure.

FIG. 10 is a schematic structural diagram of a network device 1000 according to an implementation of the present disclosure. As shown in FIG. 10, the network device includes a processor 1010, a transceiver 1020, and a memory 1030, wherein the processor 1010, the transceiver 1020, and the memory 1030 communicate with each other through an internal connection path. The memory 1030 is used for storing instructions, and the processor 1010 is used for executing instructions stored in the memory 1030 to control the transceiver 1020 to send or receive signals.

Optionally, the processor 1010 may call the program codes stored in the memory 1030 to perform corresponding operations of network device in the method 400 shown in FIG. 4, which will not be described here repeatedly for brevity.

It should be understood that in the implementation of the present disclosure, the processor 1010 may be a Central Processing Unit (CPU), or the processor 1010 may be other general purpose processor, digital signal processor (DSP), application specific integrated circuit (ASIC), Field Programmable Gate Array (FPGA), or other programmable logic device, discrete gate or transistor logic device, discrete hardware component, etc. The general purpose processor may be a microprocessor, or the processor may be any conventional processor or the like.

The memory 1030 may include a read only memory and a random access memory and provide instructions and data to the processor 1010. A portion of memory 1030 may also include a non-volatile random access memory. For example, the memory 1030 may also store device type information.

In an implementation process, the acts of the methods described above may be accomplished by integrated logic circuits of hardware in the processor 1010 or instructions in a form of software. The acts of the method disclosed in the implementation of the present disclosure may be directly accomplished by an execution of a hardware processor or accomplished by a combination of hardware and software modules in the processor 1010. The software modules may be located in typical storage medium in the art, such as a random access memory, flash memory, read-only memory, programmable read-only memory or electrically erasable programmable memory, or register. The storage medium is located in the memory 1030, and the processor 1010 reads the information in the memory 1030 and accomplishes the acts of the above method in combination with its hardware. In order to avoid repetition, it will not be described in detail here.

The network device 1000 according to the implementation of the present disclosure may correspond to the network device for executing the method 400 in the method 400 and the network device 800 according to the implementation of the present disclosure, and various units or modules in the network device 1000 are respectively used for executing various actions or processing processes executed by the network device in the method 400. Here, in order to avoid redundancy, detailed description thereof is omitted.

Figure 11:
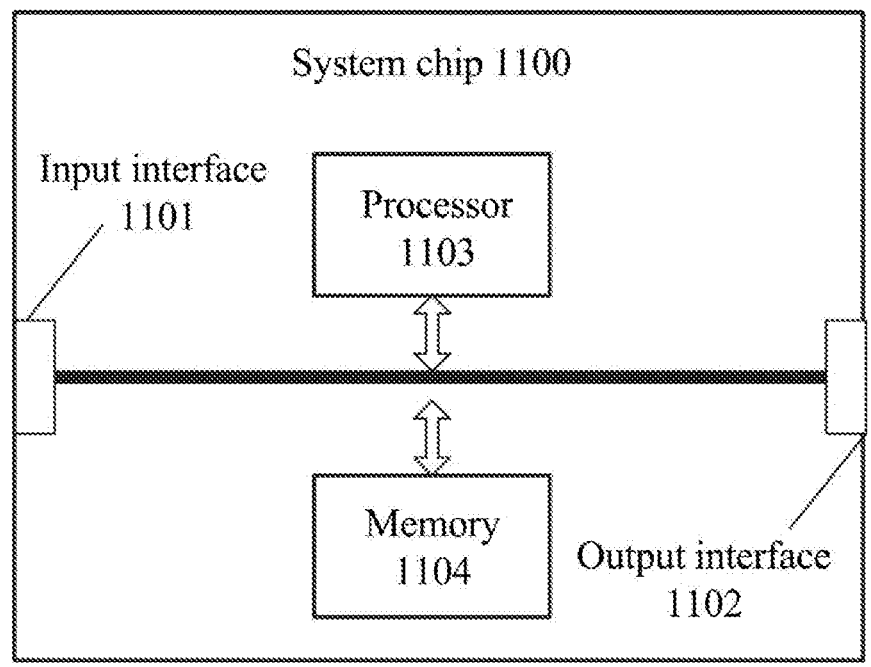
FIG. 11 is a schematic structural diagram of a system chip according to an implementation of the present disclosure.

FIG. 11 is a schematic structural diagram of a system chip according to an implementation of the present disclosure. The system chip 1100 of FIG. 11 includes an input interface 1101, an output interface 1102, at least one processor 1103, and a memory 1104. The input interface 1101, the output interface 1102, the processor 1103, and the memory 1104 are connected to each other through an internal connection path. The processor 1103 is used for executing codes in the memory 1104.

Optionally, the processor 1103 may implement the method 300 executed by the terminal device in the method implementation when the codes are executed. For the sake of brevity, it will not be repeated here.

Optionally, the processor 1103 may implement the method 400 executed by the network device in the method implementation when the codes are executed. For the sake of brevity, it will not be repeated here.

Figure 12:
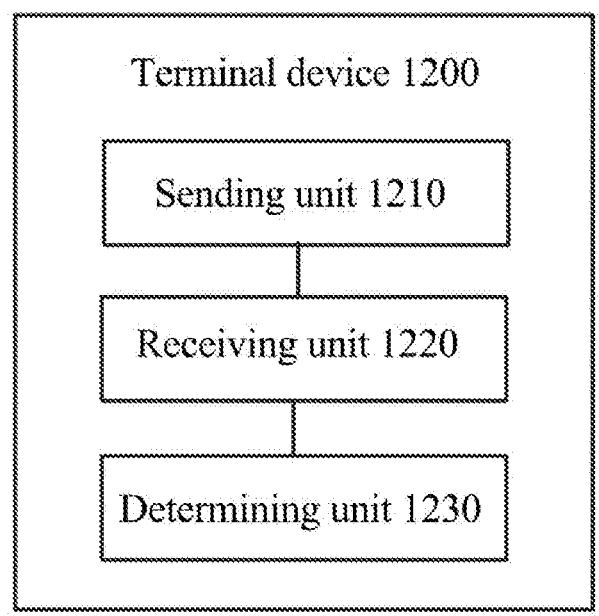
FIG. 12 is a schematic structural diagram of a terminal device according to an implementation of the present disclosure.

FIG. 12 is a schematic block diagram of a terminal device 1200 according to an implementation of the present disclosure. As shown in FIG. 12, the terminal device 1200 includes a sending unit 1210, a receiving unit 1220, and a determining unit 1230.

The sending unit 1210 is used for sending an access request message to a network device.

The receiving unit 1220 is used for receiving an access response message sent by the network device according to the access request message.

The determining unit 1230 is used for determining access suggestion information corresponding to the access auxiliary information of the terminal device according to the access response message received by the receiving unit 1220.

Therefore, the terminal device determines the access suggestion information corresponding to the access auxiliary information in the random access procedure, so that the terminal device can re-access according to the access suggestion information, and the probability of conflict between the terminal device and other terminal devices when re-accessing is reduced, and the success rate of random access by the terminal device is improved.

Optionally, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, the access suggestion information includes at least one of: information of a duration during which the terminal device is prohibited from accessing, information of a cell where the network device suggests the terminal device to reside, and information of a network that the network device suggests the terminal device to access.

Optionally, the determining unit 1230 is specifically used for: determining the access suggestion information corresponding to the access auxiliary information according to the access auxiliary information and a first mapping relationship, wherein the first mapping relationship is used for representing a correspondence between a plurality of pieces of access auxiliary information and a plurality of pieces of access suggestion information.

Optionally, the access response message includes the first mapping relationship; or a broadcast message sent by the network device to the terminal device includes the first mapping relationship; or the first mapping relationship is agreed in advance between the network device and the terminal device.

Optionally, the access request message includes an access preamble sequence or a scheduling request message; or the access request message includes a radio resource control (RRC) connection setup request message, and the access response message includes an RRC connection rejection message; or the access request message includes an RRC connection setup completion message, and the access response message includes an RRC connection release message; or the access request message includes a protocol data unit (PDU), and the access response message includes a protocol data unit (PDU).

It should be understood that the terminal device 1200 may correspond to the terminal device in the method implementation and may realize the corresponding functions of the terminal device. For the sake of brevity, it will not be repeated here.

Figure 13:
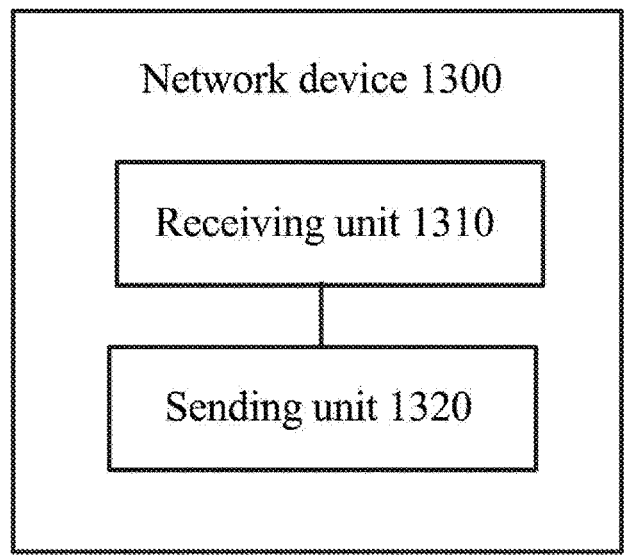
FIG. 13 is a schematic structural diagram of a network device according to an implementation of the present disclosure.

FIG. 13 is a schematic block diagram of a network device 1300 according to an implementation of the present disclosure. As shown in FIG. 13, the network device 1300 includes a receiving unit 1310 and a sending unit 1320.

The receiving unit 1310 is used for receiving an access request message sent by a terminal device.

The sending unit 1320 is used for sending an access response message to the terminal device according to the access request message received by the receiving unit 1310, wherein the access response message includes a first mapping relationship including a correspondence between a plurality of pieces of access auxiliary information and a plurality of pieces of access suggestion information, so that the terminal device determines access suggestion information corresponding to access auxiliary information of the terminal device according to the access auxiliary information and the first mapping relationship.

Therefore, the network device informs the terminal device of the correspondence between the access auxiliary information and the access suggestion information in a process of sending, by the network device, the access response message information to the terminal device, so that the terminal device can acquire access suggestion information corresponding to respective access auxiliary information, thereby reducing a probability of collision between the terminal device and other terminal devices when the terminal device re-accesses and improving the success rate of random access of the terminal device.

Optionally, the access auxiliary information includes at least one of: access information of the terminal device, device information of the terminal device, service information of the terminal device, a type of a bearer set up by the terminal device, a data stream for transmitting an access request message, and a logical channel for transmitting the access request message.

Optionally, the access information of the terminal device includes an access level of the terminal device; the device information of the terminal device includes a priority of the terminal device and/or a device type of the terminal device; the service information of the terminal device includes at least one of the following information: a service application level of the terminal device, a service quality level of the terminal device, a reason for the terminal device to set up the service, core network information for the terminal device to set up the service, and a service type of the service.

Optionally, the access suggestion information includes at least one of: information of a duration during which the terminal device is prohibited from accessing, information of a cell where the network device suggests the terminal device to reside, and information of a network that the network device suggests the terminal device to access.

Optionally, the access request message includes a preamble sequence or a scheduling request message; or the access request message includes a radio resource control (RRC) connection setup request message, and the access response message includes an RRC connection rejection message; or the access request message includes an RRC connection setup completion message, and the access response message includes an RRC connection release message; or the access request message includes a protocol data unit (PDU), and the access response message includes a protocol data unit (PDU).

Figure 14:
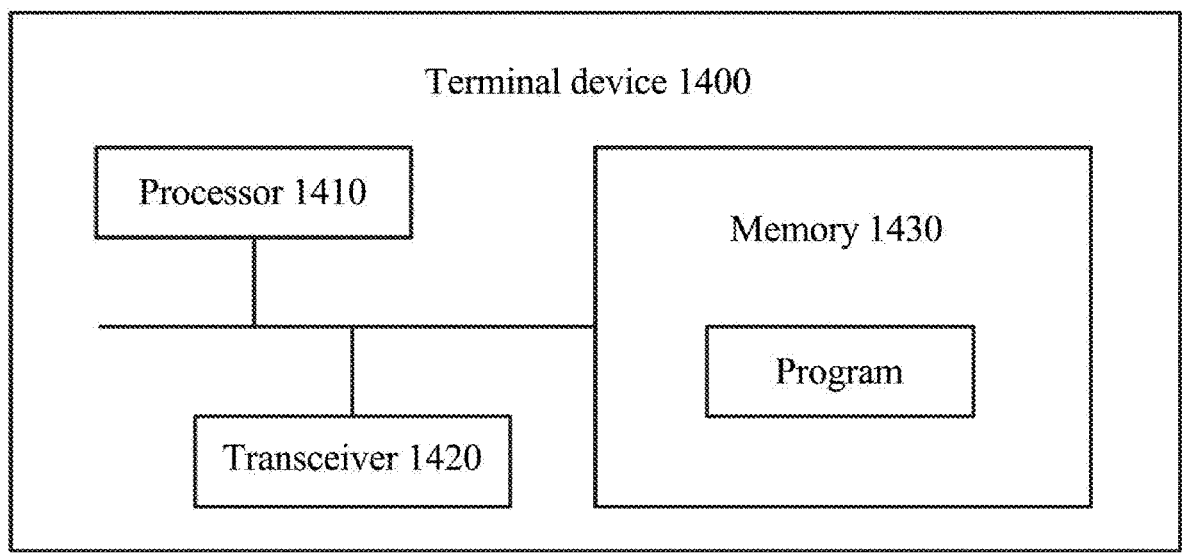
FIG. 14 is a schematic structural diagram of a terminal device according to an implementation of the present disclosure.

FIG. 14 is a schematic structural diagram of a terminal device 1400 according to an implementation of the present disclosure. As shown in FIG. 14, the terminal device includes a processor 1410, a transceiver 1420, and a memory 1430, wherein the processor 1410, the transceiver 1420, and the memory 1430 communicate with each other through an internal connection path. The memory 1430 is used for storing instructions, and the processor 1410 is used for executing instructions stored in the memory 1430 to control the transceiver 1420 to send or receive signals.

Optionally, the processor 1410 may call the program codes stored in the memory 1430 to perform corresponding operations of terminal device in the method 500 shown in FIG. 5, which will not be described here repeatedly for brevity.

It should be understood that, in an implementation of the present disclosure, the processor 1410 may be a central processing unit (CPU), or the processor 1410 may be other general purpose processor, a digital signal processor (DSP), an application specific integrated circuit (ASIC), a field programmable gate array (FPGA), or other programmable logic device, a discrete gate or a transistor logic device, or a discrete hardware component, etc. The general purpose processor may be a microprocessor, or the processor may be any conventional processor or the like.

The memory 1430 may include a read only memory and a random access memory and provide instructions and data to the processor 1410. A portion of memory 1430 may also include a non-volatile random access memory. For example, the memory 1430 may also store device type information.

In an implementation process, the acts of the methods described above may be accomplished by integrated logic circuits of hardware in the processor 1410 or instructions in a form of software. The acts of the method disclosed in the implementation of the present disclosure may be directly accomplished by an execution of a hardware processor or accomplished by a combination of hardware and software modules in the processor 1410. The software modules may be located in typical storage medium in the art, such as a random access memory, flash memory, read-only memory, programmable read-only memory or electrically erasable programmable memory, or register. The storage medium is located in the memory 1430, and the processor 1410 reads the information in the memory 1430 and accomplishes the acts of the above method in combination with its hardware. In order to avoid repetition, it will not be described in detail here.

The terminal device 1400 according to the implementation of the present disclosure may correspond to the terminal device for executing the method 500 in the method 500 and the terminal device 1200 according to the implementation of the present disclosure, and various units or modules in the terminal device 1400 are respectively used for executing various actions or processing processes executed by the terminal device in the method 500. Here, in order to avoid redundancy, detailed description thereof is omitted.

Figure 15:
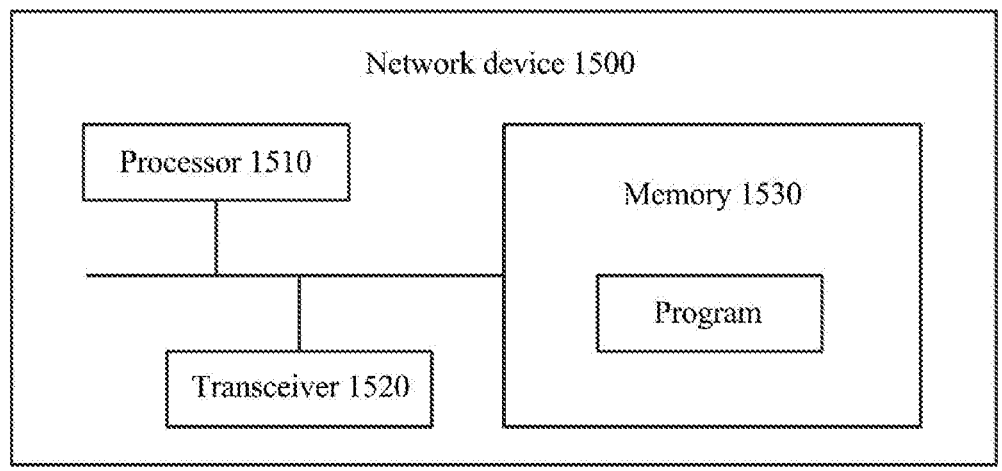
FIG. 15 is a schematic structural diagram of a network device according to an implementation of the present disclosure.

FIG. 15 is a schematic structural diagram of a network device 1500 according to an implementation of the present disclosure. As shown in FIG. 15, the network device includes a processor 1510, a transceiver 1520, and a memory 1530, wherein the processor 1510, the transceiver 1520, and the memory 1530 communicate with each other through an internal connection path. The memory 1530 is used for storing instructions, and the processor 1510 is used for executing instructions stored in the memory 1530 to control the transceiver 1520 to send or receive signals.

Optionally, the processor 1510 may call the program codes stored in the memory 1530 to perform corresponding operations of network device in the method 600 shown in FIG. 6, which will not be described here repeatedly for brevity.

It should be understood that in the implementation of the present disclosure, the processor 1510 may be a Central Processing Unit (CPU), or the processor 1510 may be other general purpose processor, digital signal processor (DSP), application specific integrated circuit (ASIC), Field Programmable Gate Array (FPGA), or other programmable logic device, discrete gate or transistor logic device, discrete hardware component, etc. The general purpose processor may be a microprocessor, or the processor may be any conventional processor or the like.

The memory 1530 may include a read only memory and a random access memory and provide instructions and data to the processor 1510. A portion of memory 1530 may also include a non-volatile random access memory. For example, the memory 1530 may also store device type information.

In an implementation process, the acts of the methods described above may be accomplished by integrated logic circuits of hardware in the processor 1510 or instructions in a form of software. The acts of the method disclosed in the implementation of the present disclosure may be directly accomplished by an execution of a hardware processor or accomplished by a combination of hardware and software modules in the processor 1510. The software modules may be located in typical storage medium in the art, such as a random access memory, flash memory, read-only memory, programmable read-only memory or electrically erasable programmable memory, or register. The storage medium is located in the memory 1530, and the processor 1510 reads the information in the memory 1530 and accomplishes the acts of the above method in combination with its hardware. In order to avoid repetition, it will not be described in detail here.

The network device 1500 according to the implementation of the present disclosure may correspond to the network device for executing the method 600 in the method 600 and the network device 1300 according to the implementation of the present disclosure, and various units or modules in the network device 1500 are respectively used for executing various actions or processing processes executed by the network device in the method 600. Here, in order to avoid redundancy, detailed description thereof is omitted.

Figure 16:
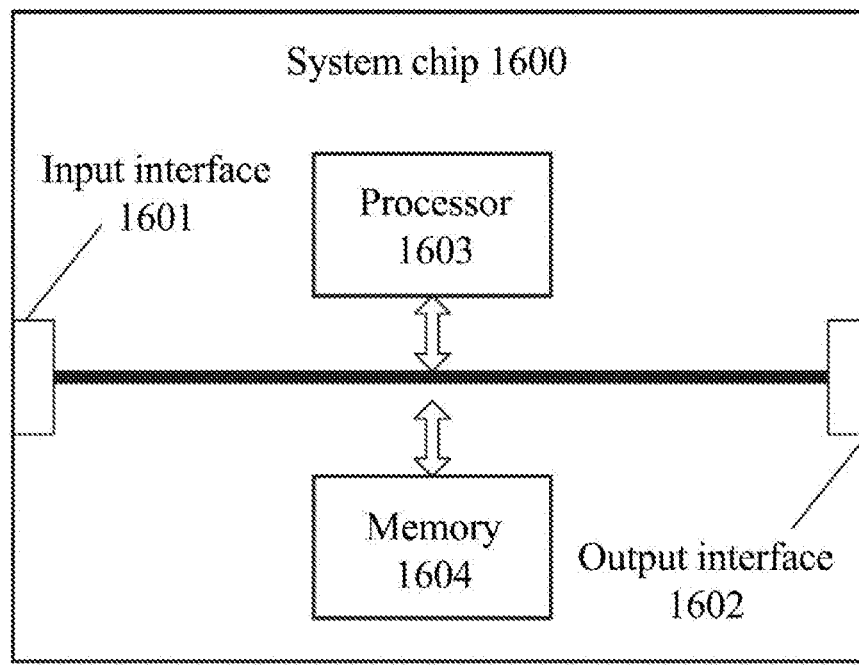
FIG. 16 is a schematic structural diagram of a system chip according to an implementation of the present disclosure.

FIG. 16 is a schematic structural diagram of a system chip according to an implementation of the present disclosure. The system chip 1600 of FIG. 16 includes an input interface 1601, an output interface 1602, at least one processor 1603, and a memory 1604. The input interface 1601, the output interface 1602, the processor 1603, and the memory 1604 are connected to each other through an internal connection path. The processor 1603 is used for executing codes in the memory 1604.

Optionally, the processor 1603 may implement the method 500 executed by the terminal device in the method implementation when the codes are executed. For the sake of brevity, it will not be repeated here.

Optionally, the processor 1603 may implement the method 600 executed by the network device in the method implementation when the codes are executed. For the sake of brevity, it will not be repeated here.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art can clearly understand that for convenience and conciseness of description, the specific working processes of the system, apparatus and unit described above may refer to the corresponding processes in the aforementioned method implementations and will not be described here.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The aforementioned storage medium include a U disk, mobile hard disk, read-only memory (ROM), random access memory (RAM), magnetic disk or optical disk and other media that can store program codes.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the implementations of the present disclosure should be based on the protection scope of the claims.

What we claim is:

1. A method for random access, comprising:
    sending, by a terminal device, an access request message to a network device, and indicating access auxiliary information of the terminal device to the network device through the access request message; and
    receiving, by the terminal device, an access response message sent by the network device according to the access request message, wherein the access response message comprises indication information for indicating rejection of access of the terminal device, and the indication information comprises access suggestion information corresponding to the access auxiliary information,
    wherein the sending, by the terminal device, the access request message to the network device, and indicating the access auxiliary information of the terminal device to the network device through the access request message, comprises:
        determining, by the terminal device, a target resource for transmitting the access request message according to the access auxiliary information and a correspondence between a plurality of pieces of access auxiliary information and a plurality of transmission resources; and
        using, by the terminal device, the target resource to send the access request message to the network device, wherein the access auxiliary information is determined according to the correspondence and the target resource for receiving the access request message,
    wherein the access suggestion information comprises at least one of the following pieces of information:
        information of a cell where the network device suggests the terminal device to reside, and information of a network that the network device suggests the terminal device to access.

2. The method according to claim 1, wherein the access auxiliary information comprises at least one of the following pieces of information:
    access information of the terminal device, device information of the terminal device, service information of the terminal device, a type of a bearer set up by the terminal device, a data stream for transmitting the access request message, and a logical channel for transmitting the access request message.

3. The method according to claim 2, wherein the access information of the terminal device comprises an access level of the terminal device;
    the device information of the terminal device comprises a priority of the terminal device or a device type of the terminal device; and
    the service information of the terminal device comprises at least one of the following pieces of information: a service application level of the terminal device, a service quality level of the terminal device, a reason for the terminal device to set up the service, core network information for the terminal device to set up the service, and a service type of the service.

4. The method according to claim 1, wherein sending, by the terminal device, the access request message to the network device, and indicating the access auxiliary information of the terminal device to the network device through the access request message, comprises:
    sending, by the terminal device, the access request message carrying the access auxiliary information to the network device.

5. A terminal device, comprising a transceiver, wherein:
    the transceiver is used for sending an access request message to a network device and indicating access auxiliary information of the terminal device to the network device through the access request message; and
    the transceiver is further used for receiving an access response message sent by the network device according to the access request message, wherein the access response message comprises indication information for indicating rejection of access of the terminal device, and the indication information comprises access suggestion information corresponding to the access auxiliary information
    wherein the transceiver is specifically used for:
        determining a target resource for transmitting the access request message according to the access auxiliary information and a correspondence between a plurality of pieces of access auxiliary information and a plurality of transmission resources; and
        using the target resource to send the access request message to the network device, wherein the access auxiliary information is determined according to the correspondence and the target resource for receiving the access request message,
    wherein the access suggestion information comprises at least one of the following pieces of information:
        information of a cell where the network device suggests the terminal device to reside, and information of a network that the network device suggests the terminal device to access.

6. The terminal device according to claim 5, wherein the access information of the terminal device comprises an access level of the terminal device;
    the device information of the terminal device comprises a priority of the terminal device or a device type of the terminal device; and
    the service information of the terminal device comprises at least one of the following pieces of information: a service application level of the terminal device, a service quality level of the terminal device, a reason for the terminal device to set up the service, core network information for the terminal device to set up the service, and a service type of the service.

7. The terminal device according to claim 5, wherein the access suggestion information further comprises:
    information of a duration during which the terminal device is prohibited from accessing,.

8. The terminal device according to claim 5, wherein the transceiver is specifically used for:
    sending the access request message carrying the access auxiliary information to the network device.

9. The terminal device according to claim 5, wherein the target resource comprises at least one of the following resources:
    a time domain resource, a frequency domain resource, a code domain resource, and a space resource.

10. The terminal device according to claim 5, wherein:
the access request message comprises an access preamble sequence or a scheduling request message; or
the access request message comprises a radio resource control (RRC) connection setup request message, and the access response message comprises an RRC connection rejection message; or
the access request message comprises an RRC connection setup completion message, and the access response message comprises an RRC connection release message; or
the access request message comprises a protocol data unit (PDU), and the access response message comprises a protocol data unit (PDU).

* * * * *